(12) United States Patent
Cho

(10) Patent No.: US 11,341,045 B2
(45) Date of Patent: May 24, 2022

(54) MEMORY APPARATUS AND METHOD FOR PROCESSING DATA USING THE SAME

(71) Applicant: SAMSUNG ELECTRONICS CO., LTD., Suwon-si (KR)

(72) Inventor: In Sang Cho, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 22 days.

(21) Appl. No.: 16/958,926

(22) PCT Filed: Nov. 9, 2018

(86) PCT No.: PCT/KR2018/013583
§ 371 (c)(1),
(2) Date: Jun. 29, 2020

(87) PCT Pub. No.: WO2019/132235
PCT Pub. Date: Jul. 4, 2019

(65) Prior Publication Data
US 2020/0341895 A1     Oct. 29, 2020

(30) Foreign Application Priority Data
Dec. 28, 2017   (KR) .................. 10-2017-0182364

(51) Int. Cl.
*G06F 12/04*     (2006.01)
(52) U.S. Cl.
CPC ...... *G06F 12/04* (2013.01); *G06F 2212/1044* (2013.01)
(58) Field of Classification Search
CPC .. G06F 12/04; G06F 12/0615; G06F 12/0623; G06F 2212/1044
(Continued)

(56) References Cited

U.S. PATENT DOCUMENTS

2006/0253640 A1* 11/2006 Lin ..................... G06F 9/30149
                                                                711/5
2011/0102447 A1*  5/2011 Lin ..................... H04N 19/423
                                                                345/570
(Continued)

FOREIGN PATENT DOCUMENTS

KR    10-2001-0070014     7/2001
KR    10-2010-0010355     2/2010
(Continued)

OTHER PUBLICATIONS

International Search Report PCT/KR2018/013583, dated Mar. 7, 2019, 4 pages.
(Continued)

*Primary Examiner* — Gary J Portka
(74) *Attorney, Agent, or Firm* — Nixon & Vanderhye, PC.

(57) ABSTRACT

A memory apparatus and a method for processing data the same are suggested to process 10-bit or 12-bit data. A processor that uses 10-bit or 12-bit data can efficiently store 10-bit or 12-bit data and provide a flexible memory access method that reduces memory usage. To this end, by adding a new memory bank that is ¼ of the size of an existing memory bank word, when storing data in 10-bit units, 2 out of 10 bits can be stored in a new memory bank to reduce memory waste. In addition, when 8-bit data is stored using a flexible memory structure, data can be stored in the same way as a previously operated memory bank.

13 Claims, 12 Drawing Sheets

(58) Field of Classification Search
USPC .............................. 711/3, 5, 171, 209, 212
See application file for complete search history.

(56) References Cited

U.S. PATENT DOCUMENTS

| | | | | |
|---|---|---|---|---|
| 2016/0057437 A1* | 2/2016 | Jeong | ....................... | H04N 9/79 |
| | | | | 375/240.25 |
| 2016/0065973 A1* | 3/2016 | Cote | ....................... | G06T 1/60 |
| | | | | 375/240.16 |

FOREIGN PATENT DOCUMENTS

| | | | | | |
|---|---|---|---|---|---|
| KR | 10-0965768 | * | 6/2010 | ......... | G11C 11/4093 |
| KR | 10-2016-0051153 | * | 5/2016 | ............. | G06F 12/08 |
| KR | 10-2016-0143055 | | 12/2016 | | |

OTHER PUBLICATIONS

Written Opinion of the ISA for PCT/KR2018/013583, dated Mar. 7, 2019, 5 pages.

\* cited by examiner

MEMORY APPARATUS AND METHOD FOR PROCESSING DATA USING THE SAME

This application is the U.S. national phase of International Application No. PCT/KR2018/013583 filed 9 Nov. 2018, which designated the U.S. and claims priority to KR Patent Application No. 10-2017-0182364 filed 28 Dec. 2017, the entire contents of each of which are hereby incorporated by reference.

TECHNICAL FIELD

Embodiments of the disclosure relate to a structure of a processor's internal memory, and relate to a memory apparatus and a method for processing data the same for processing the data in 10-bit or 12-bit units.

BACKGROUND ART

Wide color gamut (high color reproduction) to increase the color gamut to reproduce an image similar to the actual color on a recent video display, or 10-bit or 12-bit High Dynamic Range (HDR) expressing the ratio of brightness that can be felt while watching the real natural environment, are utilized more frequently. Processors that perform such image processing tend to use frequency of pixel information of an image from 8 bits to 10 bits or 12 bits.

An internal memory of current processor is stored in 8-bit (byte) units using byte unit addresses, and non-8-bit data is processed and stored in 8-bit units.

As such, since the internal memory of the current processors stores data in 8-bit units, 16-bit memory space must be allocated and stored in order to store 10-bit or 12-bit data. For example, in order to store 10-bit data, an additional 8-bit memory capacity is required to store 2 out of 10 bits, resulting in inefficient memory usage. Such inefficient use of memory can result in an increase in cost and performance degradation of a system operating by using a small resource such as an embedded processor.

SUMMARY

One aspect of the embodiment in order to solve the above-mentioned problems suggests a memory apparatus capable of efficiently storing 10-bit or 12-bit data and a data processing method and a recording medium for executing the same.

In accordance with an aspect of the disclosure, a memory apparatus comprises, a plurality of memory banks storing data; and a memory controller configured to allocate addresses for accessing the plurality of memory banks according to a bit unit of the data, and the memory controller may process 10-bit data by allocating addresses in 8-bit units for some of the plurality of the memory banks, and allocating addresses in 2-bit units for the other memory banks.

The plurality of memory banks may further include: a first memory bank to which addresses are allocated in the 8-bit unit, and a second memory bank to which addresses are allocated in the 2-bit unit, and the memory controller may determine whether to access only the first memory bank or access the first memory bank and the second memory bank according to the bit unit of the data.

The memory controller may process the 8-bit unit data by accessing only the first memory bank when the data is in 8-bit units.

The memory controller may access the first memory bank and the second memory bank to combine and process the 8-bit unit data of the first memory bank and the 2-bit unit data of the second memory bank when the data is in 10-bit units.

The first memory bank may include an 8-bit operation area for accessing the 8-bit unit data and a 10-bit operation area for accessing the 10-bit unit data.

The second memory bank may include a 10-bit operation area for accessing the 10-bit unit data.

The memory controller may access the first memory bank and the second memory bank by dividing the 10-bit unit data into upper 8-bit unit data and lower 2-bit unit data The memory controller may access the upper 8-bit unit data to the 10-bit operation area of the first memory bank, and access the lower 2-bit unit data to the 10-bit operation area of the second memory bank and then combine the accessed upper 8-bit unit data and the accessed lower 2-bit unit data.

The first memory bank may use an 8-bit unit address in the 10-bit operation area, and is composed of the plurality of memory banks, and the plurality of memory banks includes bank 0, bank 1, and bank 3.

The second memory bank may use a 2-bit unit address in the 10-bit operation area, and is composed of bank 4.

The memory controller may allocate 8-bit memory space at a $3^{rd}$ position of bank 2 when the memory controller stores the 10-bit unit data in addresses 10 to 11 of the 8-bit operation area, and may all use 16-bit memory space by allocating 8-bit memory space at a $4^{th}$ position of the bank 2.

The memory controller may allocate 8-bit memory space at a $2^{nd}$ position of the bank 1 when the memory controller stores the 10-bit unit data in addresses 10 to 11 of the 10-bit operation area, and may all use 10-bit memory space by allocating 2-bit memory space at a $6^{th}$ position of the bank 4.

The first memory bank and the second memory bank may further include a 12-bit operation area for accessing 12-bit unit data, and the memory controller may access to the first memory bank and the second memory bank by dividing the 12-bit unit data into upper 8-bit unit data and lower 4-bit unit data.

The memory controller may access the upper 8-bit unit data to the 12-bit operation area of the first memory bank, and may access the lower 4-bit unit data to the 12-bit operation area of the second memory bank and then may combine the accessed upper 8-bit unit data and the accessed lower 2-bit unit data.

In accordance with an aspect of the disclosure, a data processing method of a memory apparatus including a plurality of memory banks for storing data includes: allocating an address in 8-bit units to a first memory bank of the plurality of memory banks; allocating the address in 2-bit units to a second memory bank of the plurality of memory banks; and processing 10-bit unit data by using the first memory bank and the second memory bank.

Also, in accordance with an aspect of the data processing method, the method further includes: determining whether to access only the first memory bank or access the first memory bank and the second memory bank according to the bit unit of the data.

Processing the 10-bit unit data may include: dividing the 10-bit unit data into upper 8-bit unit data and lower 2-bit unit data; accessing the upper 8-bit unit data to the first memory bank; accessing the lower 2-bit unit data to the second memory bank; and combining and processing the upper 8-bit unit data and the lower 2-bit unit data.

In accordance with an aspect of the disclosure, a computer-readable recording medium may include: an instruction allocating an address in 8-bit units to a first memory bank of a plurality of memory banks storing data; allocating the address in 2-bit units to a second memory bank of the plurality of memory banks; and causing a processor to perform an operation of processing 10-bit unit data using the first memory bank and the second memory bank.

According to a memory apparatus and a method for processing data the same, a processor that uses 10-bit or 12-bit data can efficiently store 10-bit or 12-bit data and provide a flexible memory access method that reduces memory usage. To this end, by adding a new memory bank that is ¼ of the size of an existing memory bank word, when storing data in 10-bit units, 2 out of 10 bits can be stored in a new memory bank to reduce memory waste. In addition, when 8-bit data is stored using a flexible memory structure, data can be stored in the same way as a previously operated memory bank.

BRIEF DESCRIPTION OF THE DRAWINGS

FIGS. 4A, 4B, 4C, and 4D are diagrams illustrating an example of data storage in a memory bank according to an embodiment.

FIG. 7 is a third diagram illustrating an example of data storage in a memory bank according to another embodiment.

FIG. 8 is a fourth diagram illustrating an example of data storage in a memory bank according to another embodiment.

DETAILED DESCRIPTION OF EXAMPLE EMBODIMENTS

Figure 1:
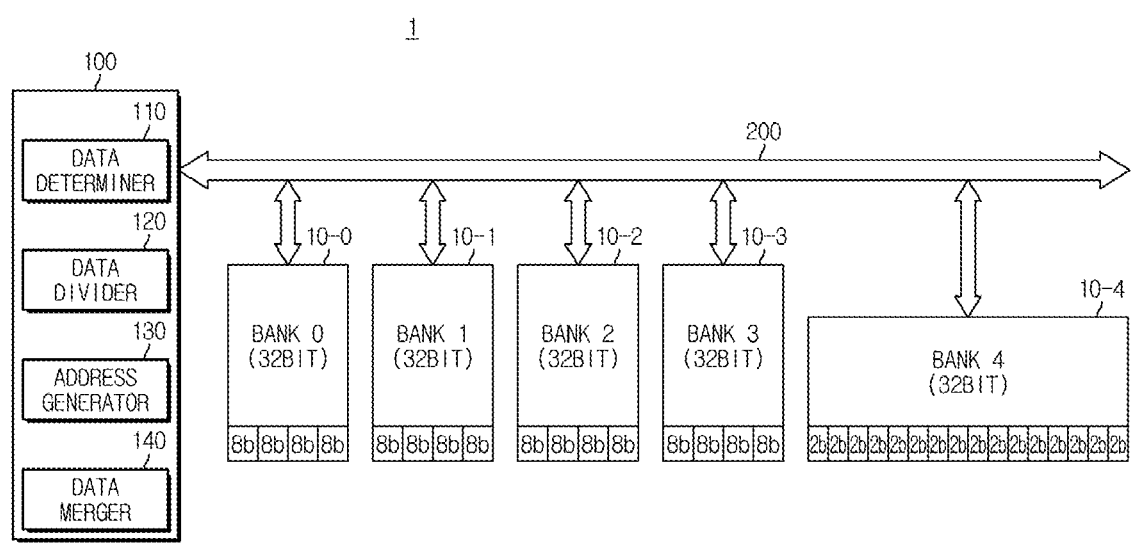
FIG. 1 is a configuration diagram of a processor's internal memory apparatus according to an embodiment.

The embodiments illustrated in the specification and the configurations illustrated in the drawings are preferred examples of the disclosure, and at the time of filing the present application, there may be various modifications that can replace the embodiments and drawings of the present specification.

In addition, the terms used herein are used to describe the embodiments, and are not intended to limit and/or restrict the disclosure. Singular expressions include plural expressions unless the context clearly indicates otherwise. In the present specification, terms such as 'include,' 'have' and 'comprise' are intended to designate the presence of features, numbers, steps, operations, configurations, or combinations thereof, or one or more other features described in the specification. The terms shall not be construed to preclude any possibility of the existence or addition of fields or numbers, steps, actions, components, parts or combinations thereof.

The terms first, second, etc. are used to distinguish one component from another component, and the component is not limited by the terms described above. The terms are used only for the purpose of distinguishing one component from other components. For example, a first component may be referred to as a second component without departing from the scope of the present invention, and similarly, a second component may be referred to as a first component. The term "and/or" includes a combination of a plurality of related described items or any one of a plurality of related described items.

Hereinafter, embodiments of the present disclosure will be described with reference to the accompanying drawings.

FIG. 1 is a configuration diagram of a processor's internal memory apparatus according to an embodiment.

As shown in FIG. 1, a memory apparatus 1 may include a plurality of memory banks 10: 10-0, 10-1, 10-2, 10-3, and 10-4, and a memory controller 100 that manages requests for storing data in the plurality of memory banks 10: 10-0, 10-1, 10-2, 10-3, and 10-4.

The plurality of memory banks 10: 10-0, 10-1, 10-2, 10-3, and 10-4 may include the first memory banks 10-0, 10-1, 10-2, and 10-3 and the second memory bank 10-4 for storing data, and one bank word may be composed of 32 bits.

The first memory banks 10-0, 10-1, 10-2, and 10-3 are memory banks that use 8-bit (byte) addresses in the same manner as previously used memory, and a plurality of the memory banks may be provided.

The plurality of first memory banks 10-0, 10-1, 10-2, and 10-3 may be configured to store 8-bit data and 10-bit data.

The second memory bank 10-4 is a new memory bank using an existing bank word, that is, a 2-bit unit address, which is ¼ of 8 bits.

Therefore, the second memory bank 10-4 may be configured to store data in 10-bit units along with the plurality of first memory banks 10-0, 10-1, 10-2, and 10-3.

The memory controller 100 can store data, access data, and manage data flow for processing the data in the first memory banks 10-0, 10-1, 10-2, and 10-3 and the second memory bank 10-4. To this end, the memory controller 100 may further include a data determiner 110, a data divider 120, an address generator 130, and a data merger 140.

The data determiner 110 determines whether data to be stored in the first memory banks 10-0, 10-1, 10-2, and 10-3, and the second memory bank 10-4 are 8 bits or 10 bits, and determine whether data to be read from the first memory banks 10-0, 10-1, 10-2, and 10-3, and the second memory bank 10-4 are 8 bits or 10 bits.

When the data determined by the data determiner 110 is 10 bits, the data divider 120 may divide 10 bits of data into upper 8 bits and lower 2 bits. Therefore, the upper 8 bits are stored in 10-bit operation areas 10-0*b*, 10-1*b*, 10-2*b*, and 10-3*b* (FIG. 2) of the first memory banks 10-0, 10-1, 10-2, and 10-3. Also, the lower 2 bits are stored in the second memory bank 10-4, specifically, in a 10-bit operation area 10-4*b* of the second memory bank 10-4.

The address generator 130 may generate an address indicating a location where data is stored. Therefore, depending on the address generated by the address generator 130, 8-bit or 10-bit data may be stored in the first memory banks 10-0, 10-1, 10-2, and 10-3 or the first memory banks 10-0, 10-1, 10-2, and 10-3 and the second memory bank 10-4.

The data merger 140 may generate data in 10-bit units by combining data stored in the first memory banks 10-0, 10-1, 10-2, and 10-3, and the second memory bank 10-4.

In addition, the memory controller 100 may transmit command & control, address, and a plurality of data information to the memory banks 10: 10-0, 10-1, 10-2, 10-3, and 10-4 through a common bus 200. The common bus 200 may include an address bus, a data bus and a control bus. The memory controller 100 may designate a corresponding memory bank among the plurality of memory banks 10: 10-0, 10-1, 10-2, 10-3, and 10-4 by a chip enable signal CE.

According to an embodiment, the memory controller 100 sets the address areas of the first memory banks 10-0, 10-1, 10-2, and 10-3, and the second memory bank 10-4 according to the application flexibly to 8-bit operation areas 10-0a, 10-1a, 10-2a, and 10-3a and the 10-bit operation areas 10-0b, 10-1b, 10-2b, 10-3b, and 10-4b.

More specifically, the memory controller 100 may set a boundary N of the first memory banks 10-0, 10-1, 10-2, and 10-3 as the 8-bit operation areas 10-0a, 10-1a, 10-2a, and 10-3a and the 10-bit operation areas 10-0b, 10-1b, 10-2b, 10-3b, and 10-4b to efficiently store 10-bit data. The 8-bit operation areas 10-0a, 10-1a, 10-2a, and 10-3a and the 10-bit operation areas 10-0b, 10-1b, 10-2b, 10-3b, and 10-4b can be set to the address desired by an application developer or a compiler can automatically set the area according to the compilation result.

Therefore, the memory controller 100 stores 8-bit data in the 8-bit operation areas 10-Oa, 10-1a, 10-2a, and 10-3a of the first memory banks 10-0, 10-1, 10-2, and 10-3, centering on the set boundary N area, and 10-bit unit data can be divided and stored in the first memory banks 10-0, 10-1, 10-2, and 10-3 and in the 10-bit operation areas 10-0b, 10-1b, 10-2b, 10-3b, and 10-4b of the second memory bank 10-4. This will be described with reference to FIG. 2.

Figure 2:
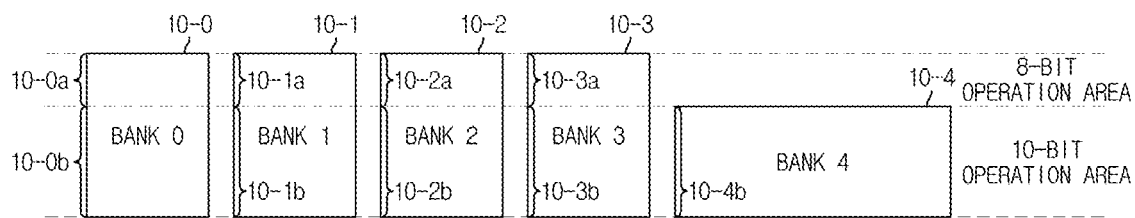
FIG. 2 is a view illustrating a boundary setting for an operation area of a memory bank according to an embodiment.

FIG. 2 is a view illustrating a boundary setting for an operation area of a memory bank according to an embodiment.

In FIG. 2, the plurality of first memory banks 10-0, 10-1, 10-2, and 10-3 includes the 8-bit operation areas 10-0a, 10-1a, 10-2a, and 10-3a for storing 8-bit data and the 10-bit operation areas 10-0b, 10-1b, 10-2b, and 10-3b for storing 10-bit unit data.

Therefore, the second memory bank 10-4 includes the plurality of first memory banks 10-0, 10-1, 10-2, and 10-3, and the 10-bit operation area 10-4b for storing 10-bit data.

The 8-bit operation areas 10-0a, 10-1a, 10-2a, and 10-3a provided in the first memory banks 10-0, 10-1, 10-2, and 10-3 are areas for program operation.

The 10-bit operation areas 10-0b, 10-1b, 10-2b, and 10-3b provided in the first memory banks 10-0, 10-1, 10-2, and 10-3 and the 10-bit operation area 10-4b provided in the second memory bank 10-4 are data storage areas.

More specifically, due to the nature of processor memory, while operating a processor, code, data, basic synchronized subset (BSS) information, and dynamically used stack and heap information can be allocated and used in the memory.

Since these types of information operate using an existing 8-bit unit address, the memory apparatus 1 divides and flexibly sets the address areas of the first memory banks 10-0, 10-1, 10-2, and 10-3 into the 8-bit operation areas 10-0a, 10-1a, 10-2a, and 10-3a and the 10-bit operation areas 10-0b, 10-1b, 10-2b, and 10-3b. The 8-bit operation areas 10-0a, 10-1a, 10-2a, and 10-3a are only used for the first memory banks 10-0, 10-1, 10-2, and 10-3, and the address value is increased by 1 internally because each 8-bit address is accessed.

The 10-bit operation areas 10-0b, 10-1b, 10-2b, 10-3b, and 10-4b use a 16-bit address space for storing 10-bit data, but the actual memory usage can be configured to store only 10 bits. Therefore, the first memory banks 10-0, 10-1, 10-2, and 10-3 can store 8 bits out of 10 bits, and the remaining 2 bits can be stored in the second memory bank 10-4.

The less the 10-bit operation areas 10-0b, 10-1b, 10-2b, 10-3b, and 10-4b are used, the less memory is used in the a 2-bit memory bank area, that is, the 10-bit operation area 10-4b of the second memory bank 10-4, because the address is easy to manage when implementing hardware.

For example, if there is no 10-bit operation area, all the second memory banks 10-4 that use 2-bit addresses are not used. When the 10-bit operation areas 10-0b, 10-1b, 10-2b, 10-3b, and 10-4b are used to the maximum, all the operation areas 10-0b, 10-1b, 10-2b, 10-3b, and 10-4b of all the memory banks 10: 10-0, 10-1, 10-2, 10-3, and 10-4 without wasting any memory can be used.

Therefore, the 8-bit operation areas 10-0a, 10-1a, 10-2a, and 10-3a can operate in the same manner as the existing operation areas using 8 bits of the first memory banks 10-0, 10-1, 10-2, and 10-3, which are the existing memory banks. On the other hand, the 10-bit operation areas 10-0b, 10-1b, 10-2b, and 10-3b can operate by using 8-bits of the existing memory bank of the first memory banks 10-0, 10-1, 10-2, and 10-3 by using 2 bits of the second memory bank 10-4, which is an added memory bank.

In addition, in the case of a system that uses a large amount of 12-bit data, 8 bits of the first memory banks 10-0, 10-1, 10-2, and 10-3 and 4 bits of the second memory bank 10-4 can be added and stored. For this, a 12-bit operation area may be separately provided in the address areas of the first memory banks 10-0, 10-1, 10-2, and 10-3, and the second memory bank 10-4.

The processor for data processing in the memory apparatus 1 includes the first memory banks 10-0, 10-1, 10-2, and 10-3 among the plurality of memory banks 10: 10-0, 10-1, 10-2, 10-3, and 10-4 storing data for allocating an address in 8-bit units, and the second memory bank 10-4 among the plurality of memory banks 10: 10-0, 10-1, 10-2, 10-3, and 10-4 for allocating an address in 2-bit units, and the processor can be implemented by a recording medium including instructions for processing 10-bit or 12-bit data using the first memory banks 10-0, 10-1, 10-2, and 10-3 and the second memory bank 10-4.

Hereinafter, an actual memory location allocated according to the access address will be described with reference to FIG. 3.

Figure 3:
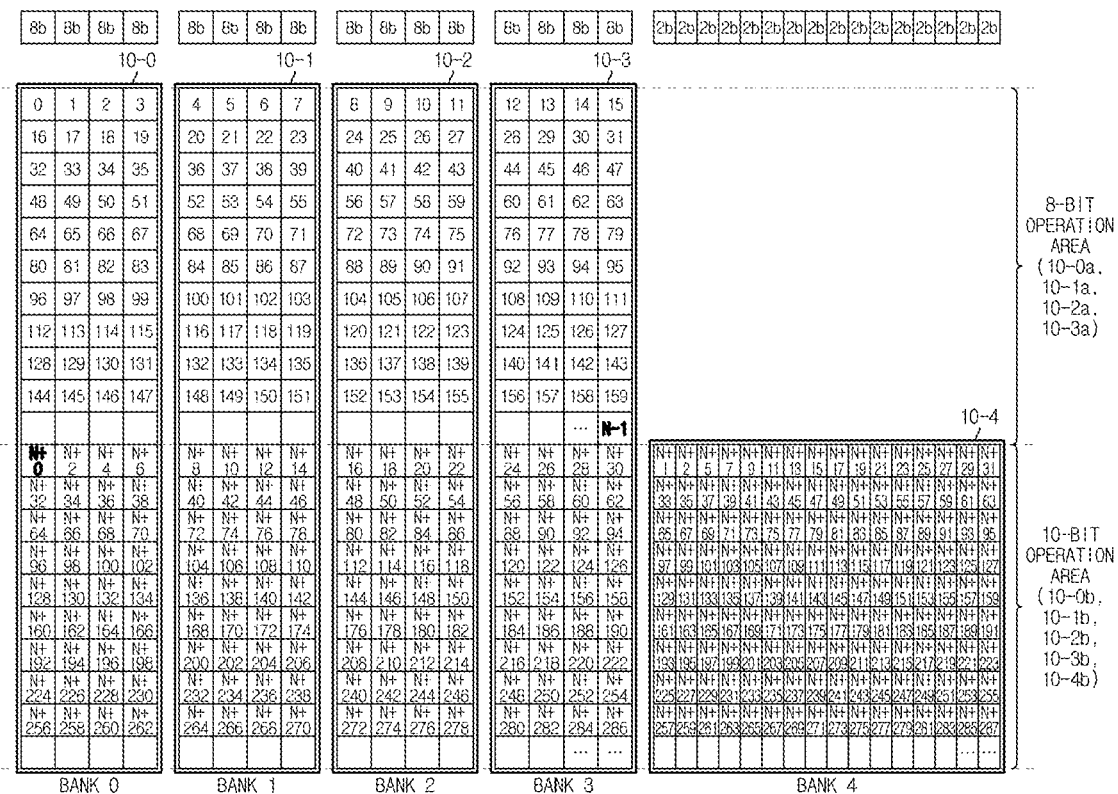
FIG. 3 is a diagram illustrating an address system of a memory bank according to an embodiment.

FIG. 3 is a diagram illustrating an address system of a memory bank according to an embodiment.

In FIG. 3, the first memory banks 10-0, 10-1, 10-2, and 10-3 bisect the memory area, thereby dividing the memory area into the 8-bit operation areas 10-0a, 10-1a, 10-2a, and 10-3a and the 10-bit operation areas 10-0b, 10-1b, 10-2b, and 10-3b based on the boundary N. Therefore, the memory controller 100 addresses the 8-bit operation areas 10-0a, 10-1a, 10-2a, and 10-3a of the first memory banks 10-0, 10-1, 10-2, and 10-3, such as ((0, 1, 2, 3, 16 . . . ), (4, 5, 6, 7, 20 . . . ), (8, 9, 10, 11, 24 . . . ), (12, 13, 14, 15, 28 . . . )), and the address value increases by one. Also, the memory controller 100 provides the address for the 10-bit operation areas 10-0b, 10-1b, 10-2b, 10-3b, and 10-4b of the first memory banks 10-0, 10-1, 10-2, and 10-3, such as ((N+0, N+2, N+4, N+6, N+32 . . . ), (N+8, N+10, N+12, N+14, N+40 . . . ), (N+16, N+18, N+20, N+22, N+48 . . . ), (N+24, N+26, N+28, N+30, N+56 . . . )), and the address value can be assigned to increase the address value by 2.

The second memory bank 10-4 is provided with the 10-bit operation area 10-4b. Therefore, the memory controller 100 sets the address for the 10-bit operation area 10-4b of the second memory bank 10-4 as (N+1, N+3, N+5, N+7, N+9 . . . ). , assigned to increase the address value by 2.

Hereinafter, an example of storing data in 10-bit units in the 8-bit operation areas 10-0a, 10-1a, 10-2a, and 10-3a and the 10-bit operation areas 10-0b, 10-1b, 10-2b, 10-3b, and 10-4b will be described with reference to FIGS. 4A to 4D.

FIGS. 4A to 4D are diagrams illustrating an example of data storage in a memory bank according to an embodiment.

Figure 4A:
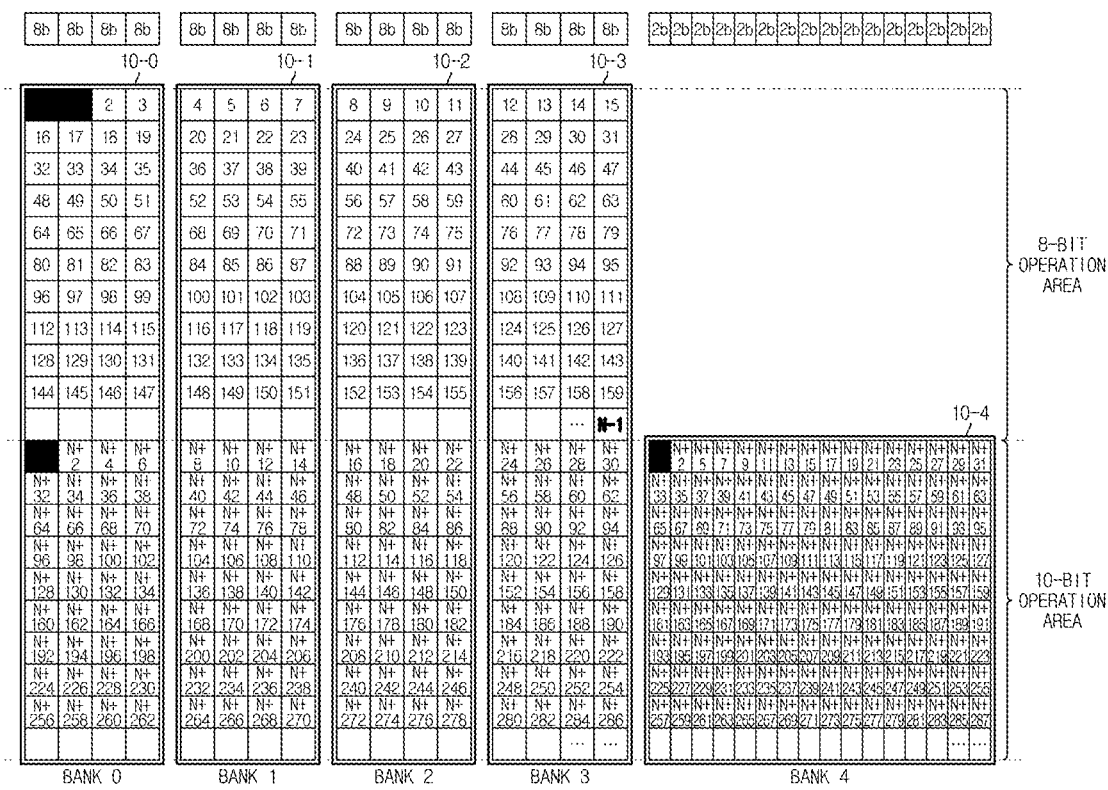

In FIG. 4A, when 10 bits are stored in addresses 0 to 1, memory usage when storing in the 8-bit operation areas 10-0a, 10-1a, 10-2a, and 10-3a and when storing in the 10-bit operation areas 10-0b, 10-1b, 10-2b, 10-3b, and 10-4b is illustrated.

As shown in FIG. 4A, when the 8-bit operation areas 10-0a, 10-1a, 10-2a, and 10-3a are used in the same way as conventional memory storage to store 10-bit data, 16-bit memory space must be allocated in the 8-bit operation areas 10-0a, 10-1a, 10-2a, and 10-3a of bank 0.

However, when the 10-bit operation areas 10-0b, 10-1b, 10-2b, 10-3b, and 10-4b are used, 8 bits out of 10 bits are allocated 8-bit memory space in the 10-bit operation area 10-0b of the bank 0, and since the remaining 2 bits out of the 10 bits are allocated 2-bit memory space in the 10-bit operation area 10-4b of bank 4, all 10-bit memory spaces are used.

Figure 4B:
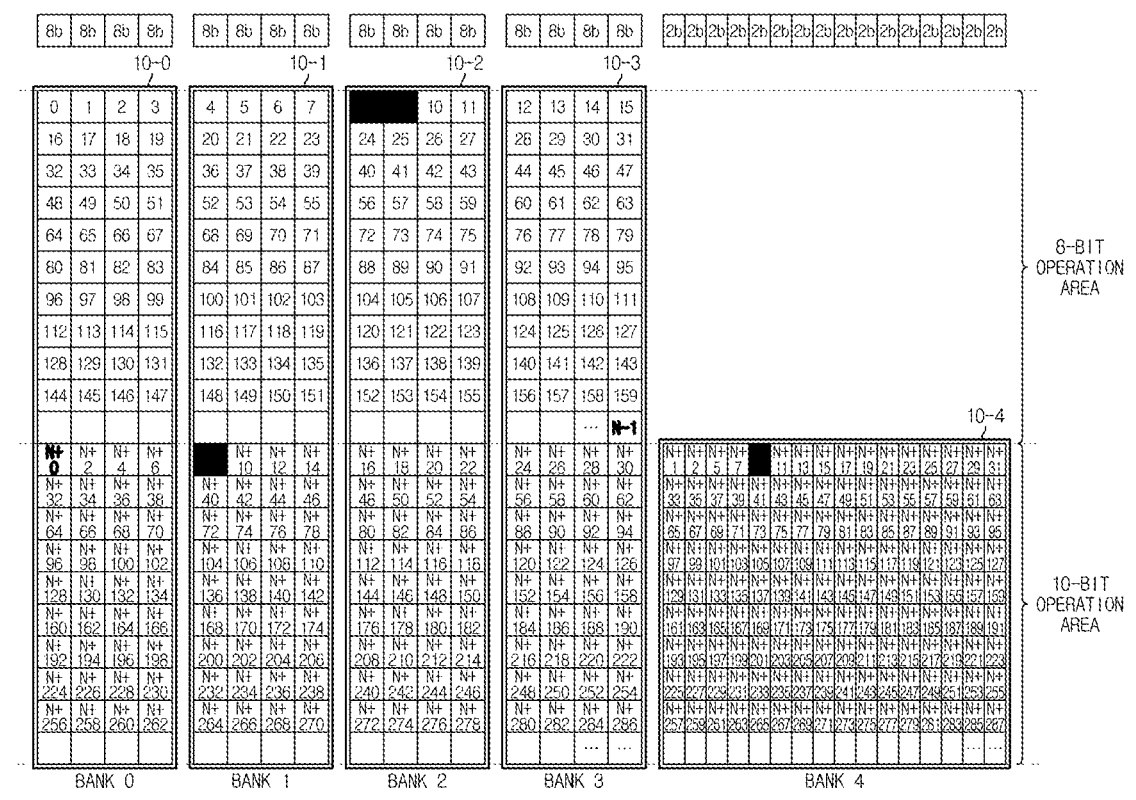

In FIG. 4B, when 10 bits are stored in addresses 8 to 9, memory usage when storing in the 8-bit operation areas 10-0a, 10-1a, 10-2a, and 10-3a and when storing in the 10-bit operation areas 10-0b, 10-1b, 10-2b, 10-3b, and 10-4b is illustrated.

As shown in FIG. 4B, when the 8-bit operation areas 10-0a, 10-1a, 10-2a, and 10-3a are used in the same way as conventional memory storage to store 10-bit data, 16-bit memory space must be allocated in the 8-bit operation area 10-2a of bank 2.

However, when the 10-bit operation areas 10-0b, 10-1b, 10-2b, 10-3b, and 10-4b are used, 8 bits out of 10 bits are allocated 8-bit memory space in the 10-bit operation area 10-1b of bank 1, and since the remaining 2 bits out of the 10 bits are allocated 2-bit memory space in the 10-bit operation area 10-4b of the bank 4, all 10-bit memory spaces are used.

Figure 4C:
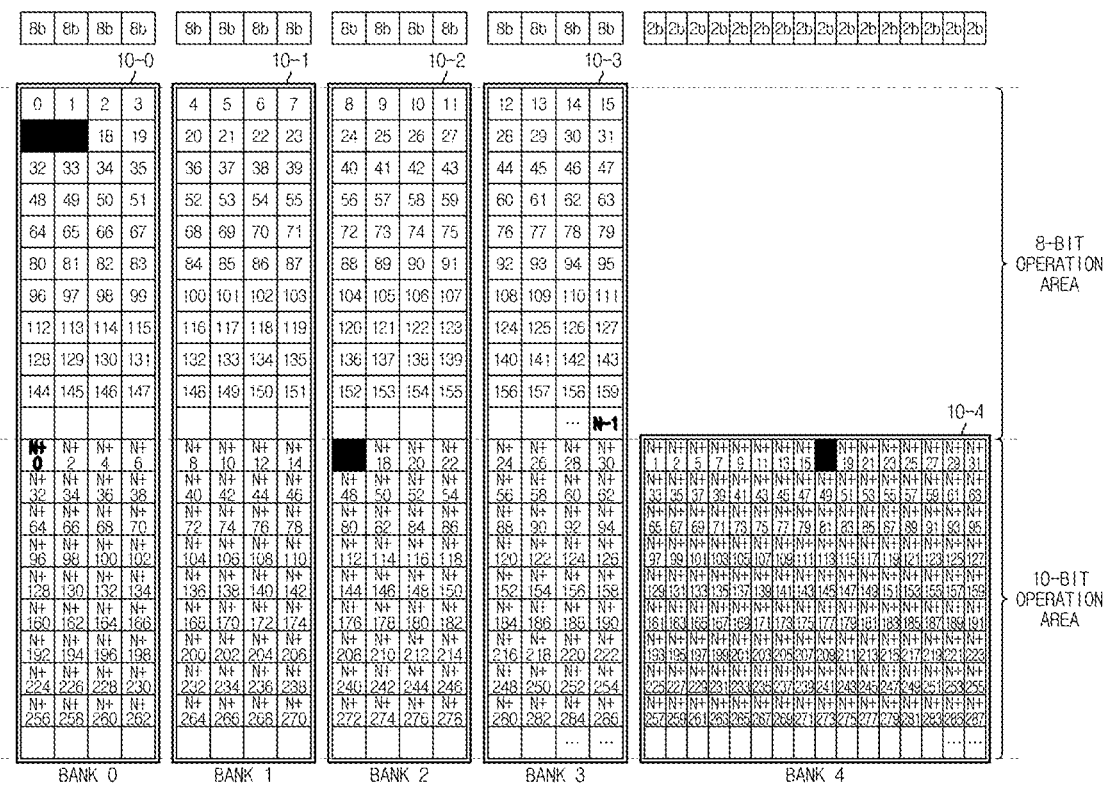

In FIG. 4C, when 10 bits are stored in addresses 16 to 17, memory usage when storing in the 8-bit operation areas 10-0a, 10-1a, 10-2a, and 10-3a and when storing in the 10-bit operation areas 10-0b, 10-1b, 10-2b, 10-3b, and 10-4b are illustrated.

As shown in FIG. 4C, when the 8-bit operation areas 10-0a, 10-1a, 10-2a, and 10-3a are used in the same way as conventional memory storage to store 10-bit data, 16-bit memory space must be allocated in the 8-bit operation area 10-0a of the bank 0.

However, when the 10-bit operation areas 10-0b, 10-1b, 10-2b, 10-3b, and 10-4b are used, 8 bits out of 10 bits are allocated 8-bit memory space in the 10-bit operation area 10-2b of the bank 2, and since the remaining 2 bits out of the 10 bits are allocated 2-bit memory space in the 10-bit operation area 10-4b of the bank 4, all 10-bit memory spaces are used.

Figure 4D:
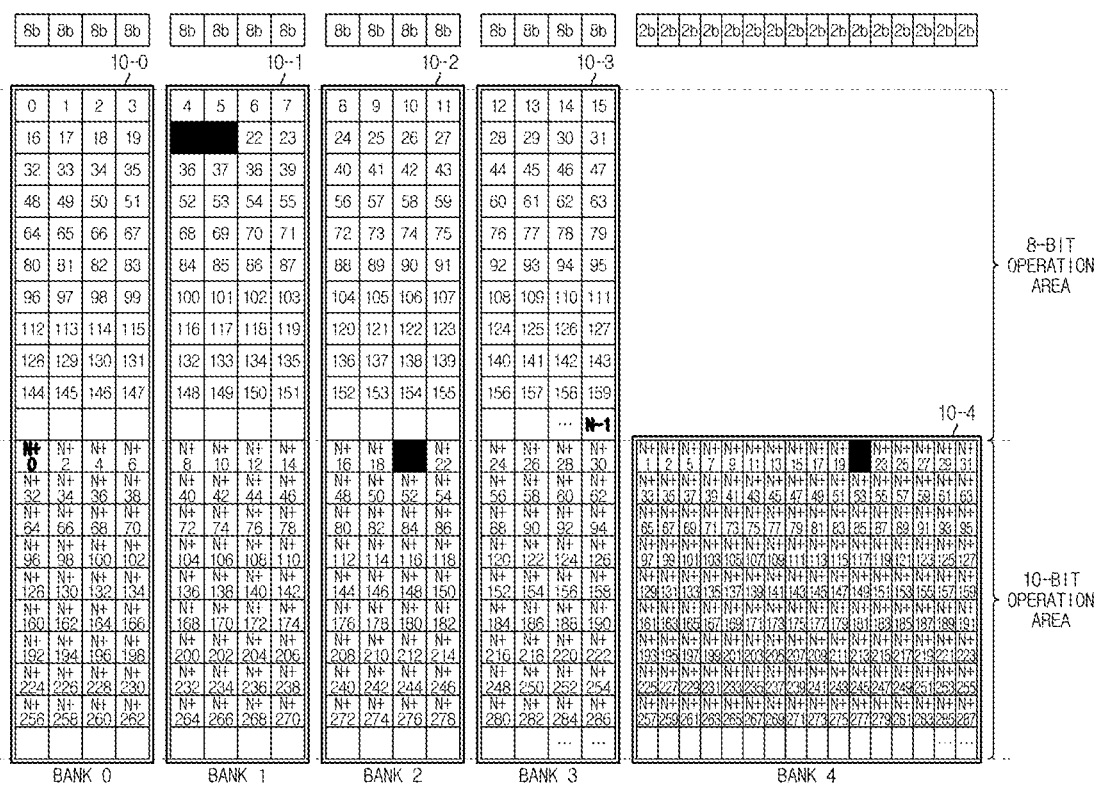

In FIG. 4D, when 10 bits are stored in addresses 20 to 21, memory usage when storing in the 8-bit operation areas 10-0a, 10-1a, 10-2a, and 10-3a and when storing in the 10-bit operation areas 10-0b, 10-1b, 10-2b, 10-3b, and 10-4b are illustrated.

As shown in FIG. 4D, when the 8-bit operation areas 10-0a, 10-1a, 10-2a, and 10-3a are used in the same way as conventional memory storage to store 10-bit unit data, 16-bit memory space must be allocated in the 8-bit operation area 10-1a of the bank 1.

However, when the 10-bit operation areas 10-0b, 10-1b, 10-2b, 10-3b, and 10-4b are used, 8 bits out of 10 bits are allocated 8-bit memory space in the 10-bit operation area 10-2b of the bank 2, and since the remaining 2 bits out of the 10 bits are allocated 2-bit memory space in the 10-bit operation area 10-4b of the bank 4, all 10-bit memory spaces are used.

As described above, when the 8-bit operation areas 10-0a, 10-1a, 10-2a, and 10-3a are used in the same way as conventional memory storage to store 10-bit data, 16-bit memory space must be allocated in the 8-bit operation areas 10-0a, 10-1a, 10-2a, and 10-3a of the bank 0, the bank 1, the bank 2, or the bank 3.

However, when the 10-bit operation area is used, 8 bits out of 10 bits are allocated 8-bit memory space in the 10-bit operation area of the bank 0, the bank 1, the bank 2 or the bank 3, and the remaining 2 bits out of the 10 bits are allocated 2-bit memory space in the 10-bit operation area 10-4b of the bank 4. Since only 25% of memory space is used than in a general memory structure, memory waste can be reduced.

Next, another example of storing data in 10-bit units in the 8-bit operation areas 10-0a, 10-1a, 10-2a, and 10-3a and the 10-bit operation areas 10-0b, 10-1b, 10-2b, 10-3b, and 10-4b will be described in detail with reference to FIGS. 5 to 8.

Figure 5:
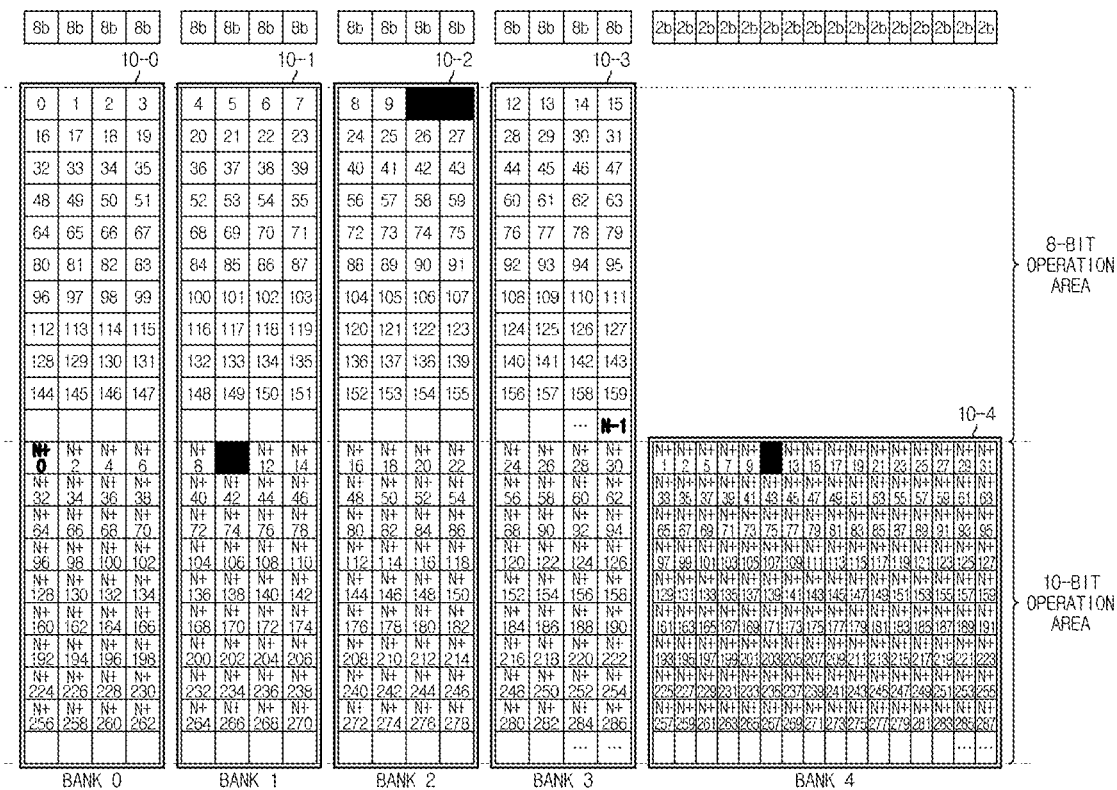
FIG. 5 is a first diagram illustrating an example of data storage in a memory bank according to another embodiment.

FIG. 5 is a first diagram illustrating an example of data storage in a memory bank according to another embodiment.

In FIG. 5, when 10 bits are stored in addresses 10 to 11, memory usage when storing in the 8-bit operation areas 10-0a, 10-1a, 10-2a, and 10-3a and when storing in the 10-bit operation areas 10-0b, 10-1b, 10-2b, 10-3b, and 10-4b are illustrated.

As shown in FIG. 5, when the 8-bit operation areas 10-0a, 10-1a, 10-2a, and 10-3a are used in the same way as conventional memory storage to store 10-bit data, 16-bit memory space must be allocated in the 8-bit operation area 10-2a of the bank 2.

However, when the 10-bit operation areas 10-0b, 10-1b, 10-2b, 10-3b, and 10-4b are used, 8 bits out of 10 bits are allocated 8-bit memory space in the 10-bit operation area 10-1b of the bank 1, and since the remaining 2 bits out of the 10 bits are allocated 2-bit memory space in the 10-bit operation area 10-4b of the bank 4, all 10-bit memory spaces are used.

As described above, when storing data in 10-bit units at addresses 10 to 11, the method of storing in the 8-bit operation areas 10-0a, 10-1a, 10-2a, and 10-3a and the 10-bit operation areas 10-0b, 10-1b, 10-2b, 10-3b, and 10-4b will be described in detail as follows.

(1-1) First, when 10-bit data is stored in addresses 10 (00001010B) to 11 (00001011B) of the 8-bit operation areas 10-0a, 10-1a, 10-2a, and 10-3a, the memory allocation space is as follows.

Addr=10 (00001010B)
Addr [31: 4]==0→use 1st row
Addr [3: 2]==2→use bank 2
Addr [1: 0]==2→3rd position in bank 2
Addr=11 (00001011B)
Addr [31: 4]==0→use 1st row
Addr [3: 2]==2→use bank 2
Addr [1: 0]==3→4th position in bank 2

(1-2) Next, when 10-bit data is stored in addresses 10 (00001010B) to 11 (00001011B) of the 10-bit operation areas 10-0b, 10-1b, 10-2b, 10-3b, and 10-4b, the memory allocation space is as follows.

Addr=10 (00001010B)
Addr [0]==0→8 bits out of 10 bits (bank 0~bank 3 used)

Addr [31: 5]==0→use 1st row
Addr [4: 3]==1→use bank 1
Addr [2: 1]==1→2nd position in bank 1
Addr=11 (00001011B)
Addr [0]==1→2 bits out of 10 bits (using bank 4)
Addr [31: 5]==0→use 1st row
Addr [4: 1]==5→6th position in bank 4

Figure 6:
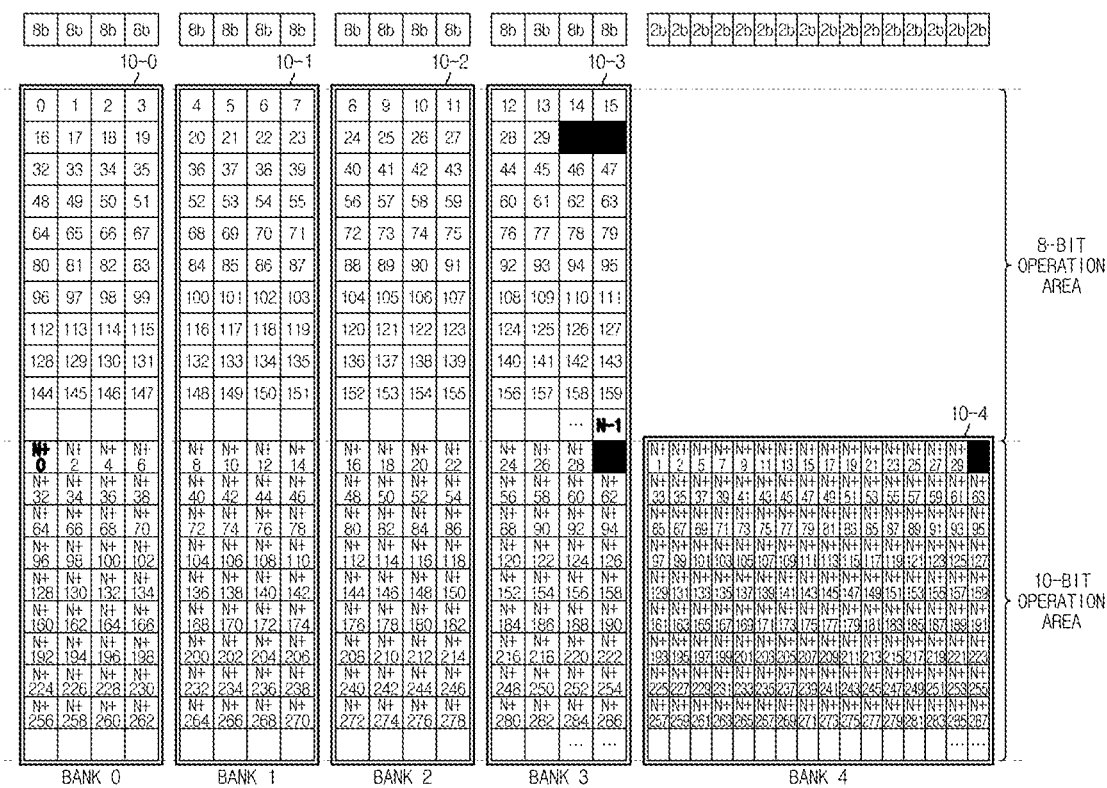
FIG. 6 is a second diagram illustrating an example of data storage in a memory bank according to another embodiment.

FIG. 6 is a second diagram illustrating an example of data storage in a memory bank according to another embodiment.

FIG. 6 shows memory usage when storing 10 bits at addresses 30 to 31, when storing at the 8-bit operation areas 10-0a, 10-1a, 10-2a, and 10-3a, and when storing at the 10-bit operation areas 10-0b, 10-1b, 10-2b, 10-3b, and 10-4b.

As shown in FIG. 6, in order to store 10-bit data, when the 8-bit operation areas 10-0a, 10-1a, 10-2a, and 10-3a are used in the same way as conventional memory storage, 16-bit memory space must be allocated in the 8-bit operation area 10-3a of the Bank 3.

However, when the 10-bit operation areas 10-0b, 10-1b, 10-2b, 10-3b, and 10-4b are used, 8 bits out of 10 bits are allocated 8-bit memory space in the 10-bit operation area 10-3b of the bank 3, and the remaining 2 bits out of 10 bits are allocated 2-bit memory space in the 10-bit operation area 10-4b of the bank 4, and all 10-bit memory spaces are used.

As described above, when storing data in 10-bit units in the access addresses 30 to 31, the method of storing in the 8-bit operation areas 10-0a, 10-1a, 10-2a, and 10-3a and the 10-bit operation areas 10-0b, 10-1b, 10-2b, 10-3b, and 10-4b will be described in detail as follows.

(2-1) First, when 10-bit data is stored in addresses 30 (00011110B) to 31 (00011111B) of the 8-bit operation areas 10-0a, 10-1a, 10-2a, and 10-3a, the memory allocation space is as follows.
Addr=30 (00011110B)
Addr [31: 4]==1→use 2nd row
Addr [3: 2]==3→use bank 3
Addr [1: 0]==2→3rd position in bank 3
Addr=31 (00011111B)
Addr [31: 4]==1→use 2nd row
Addr [3: 2]==3→use bank 3
Addr [1: 0]==3→4th position in bank 3

(2-2) Next, when 10-bit data is stored in addresses 30 (00011110B) to 31 (00011111B) of the 10-bit operation areas 10-0b, 10-1b, 10-2b, 10-3b, and 10-4b, the memory allocation space is as follows.
Addr=30 (00011110B)
Addr [0]==0→8 bits out of 10 bits (bank 0~bank 3 used)
Addr [31: 5]==0→use 1st row
Addr [4: 3]==3→use bank 3
Addr [2: 1]==3→4th position in bank 3
Addr=31 (00011111B)
Addr [0]==1→2 bits out of 10 bits (using bank 4)
Addr [31: 5]==0→use 1st row
Addr [4: 1]==15→16th position in bank 4

Figure 7:
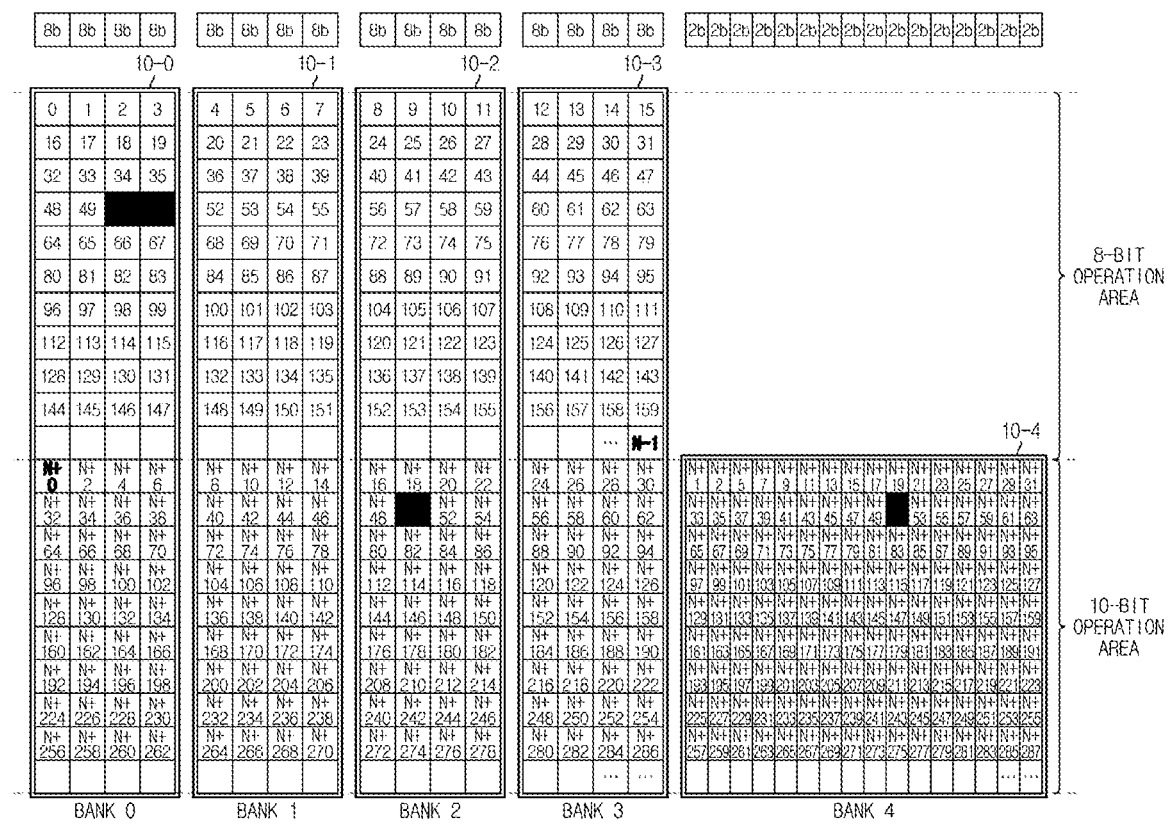

FIG. 7 is a third diagram illustrating an example of data storage in a memory bank according to another embodiment.

In FIG. 7, when 10 bits are stored in addresses 30 to 31, memory usage when storing in the 8-bit operation areas 10-0a, 10-1a, 10-2a, and 10-3a and when storing in the 10-bit operation areas 10-0b, 10-1b, 10-2b, 10-3b, and 10-4b are illustrated.

As shown in FIG. 7, when the 8-bit operation areas 10-0a, 10-1a, 10-2a, and 10-3a are used in the same way as conventional memory storage to store 10-bit data, 16-bit memory space must be allocated in the 8-bit operation area 10-0a of the bank 0.

However, when the 10-bit operation areas 10-0b, 10-1b, 10-2b, 10-3b, and 10-4b are used, 8 bits out of 10 bits are allocated 8-bit memory space in the 10-bit operation area 10-2b of the bank 2, and since the remaining 2 bits out of the 10 bits are allocated 2-bit memory space in the 10-bit operation area 10-4b of the bank 4, all 10-bit memory spaces are used.

As described above, when storing data in 10-bit units in the access addresses 50 to 51, the method of storing in the 8-bit operation areas 10-0a, 10-1a, 10-2a, and 10-3a and the 10-bit operation areas 10-0b, 10-1b, 10-2b, 10-3b, and 10-4b will be described in detail as follows.

(3-1) First, when 10-bit data is stored in addresses 50 (00110010B) to 51 (00110011B) of the 8-bit operation areas 10-0a, 10-1a, 10-2a, and 10-3a, the memory allocation space is as follows.
Addr=50 (00110010B)
Addr [31: 4]==3→use 4th row
Addr [3: 2]==0→use bank 0
Addr [1: 0]==2→3rd position in bank 0
Addr=51 (00110011B)
Addr [31: 4]==3→use 4th row
Addr [3: 2]==0→use bank 0
Addr [1: 0]==3→4th position in bank 0

(3-2) Next, when 10-bit data is stored in addresses 50 (00110010B) to 51 (00110011B) of the 10-bit operation areas 10-0b, 10-1b, 10-2b, 10-3b, and 10-4b, the memory allocation space is as follows.
Addr=50 (00110010B)
Addr [0]==0→8 bits out of 10 bits (bank 0~bank 3 used)
Addr [31: 5]==1→use 2nd row
Addr [4: 3]==2→use bank 2
Addr [2: 1]==1→2nd position in bank 2
Addr=51 (00110011B)
Addr [0]==1→2 bits out of 10 bits (using bank 4)
Addr [31: 5]==1→use 2nd row
Addr [4: 1]==9→10th position in bank 4

Figure 8:
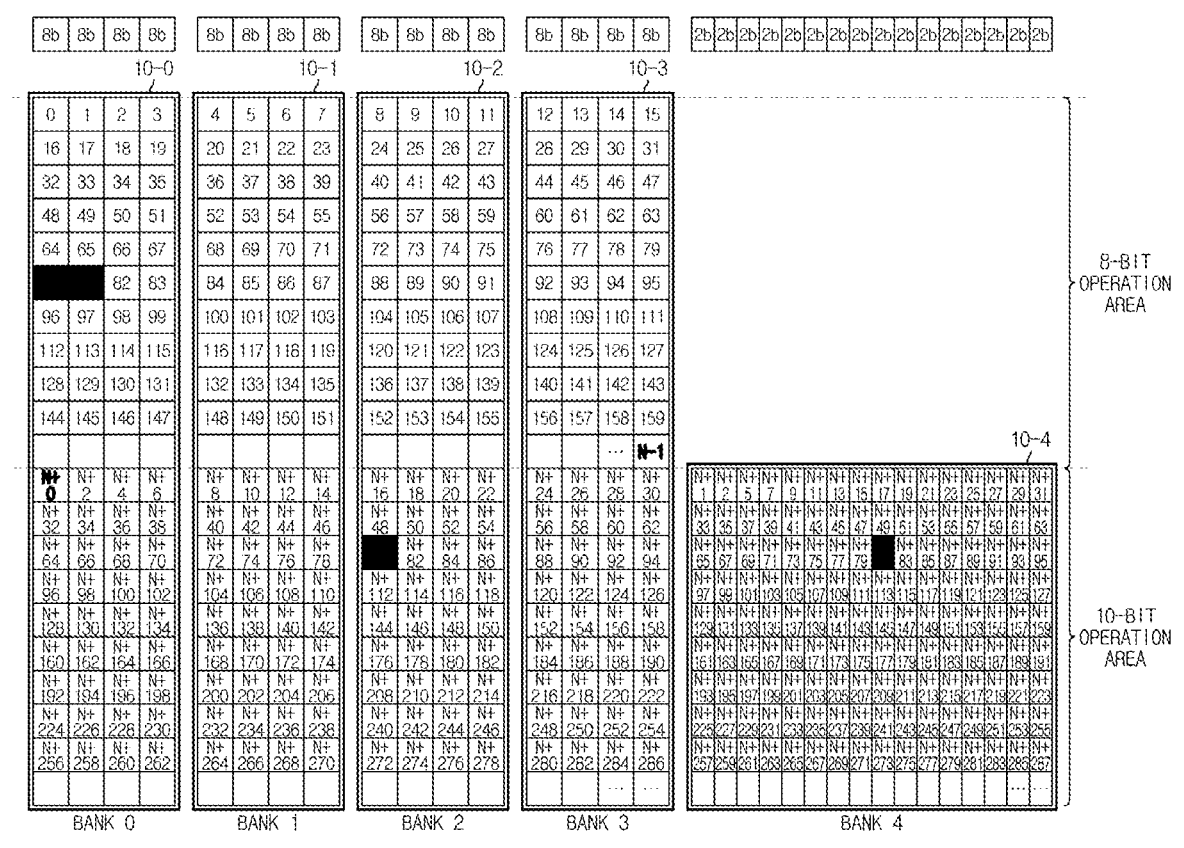

FIG. 8 is a fourth diagram illustrating an example of data storage in a memory bank according to another embodiment.

In FIG. 8, when 10 bits are stored in addresses 80 to 81, memory usage when storing in the 8-bit operation areas 10-0a, 10-1a, 10-2a, and 10-3a and when storing in the 10-bit operation areas 10-0b, 10-1b, 10-2b, 10-3b, and 10-4b is shown.

As shown in FIG. 8, when the 8-bit operation areas 10-0a, 10-1a, 10-2a, 10-3a are used in the same way as the conventional memory storage to store 10-bit unit data, 16-bit memory space must be allocated in the 8-bit operation area 10-0a of the bank 0.

However, when the 10-bit operation areas 10-0b, 10-1b, 10-2b, 10-3b, and 10-4b are used, 8 bits out of 10 bits are allocated 8-bit memory space in the 10-bit operation area 10-2b of the bank 2, and since the remaining 2 bits out of the 10 bits are allocated 2-bit memory space in the 10-bit operation area 10-4b of the bank 4, all 10-bit memory spaces are used.

As described above, when storing data in 10-bit units in the access addresses 80 to 81, the method of storing in the 8-bit operation areas 10-0a, 10-1a, 10-2a, and 10-3a and the 10-bit operation areas 10-0b, 10-1b, 10-2b, 10-3b, and 10-4b will be described in detail as follows.

(4-1) First, when 10-bit data is stored in addresses 80 (01010000B) to 81 (01010000B) of the 8-bit operation areas 10-0a, 10-1a, 10-2a, and 10-3a, the memory allocation space is as follows.
Addr=80 (01010000B)
Addr [31: 4]==5→use row 6

Addr [3: 2]=0→use bank 0
Addr [1: 0]=0→1st position in bank 0
Addr=81 (01010000B)
Addr [31: 4]=5→use row 6
Addr [3: 2]=0→use bank 0
Addr [1: 0]=1→2nd position in bank 0

(4-2) Next, when 10-bit data is stored in addresses 80 (01010000B) to 81 (01010000B) of the 10-bit operation areas 10-0b, 10-1b, 10-2b, 10-3b, and 10-4b, the memory allocation space is as follows.

Addr=80 (01010000B)
Addr [0]=0→8 bits out of 10 bits (bank 0~bank 3 used)
Addr [31: 5]=2→use 3rd row
Addr [4: 3]=2→use bank 2
Addr [2: 1]=0→1st position in bank 2
Addr=81 (01010000B)
Addr [0]=1→2 bits out of 10 bits (using bank 4)
Addr [31: 5]=2→use 3rd row
Addr [4: 1]=8→9th position in bank 4

Hereinafter, a method of distinguishing the 8-bit operation areas 10-0a, 10-1a, 10-2a, and 10-3a from the 10-bit operation areas 10-0b, 10-1b, 10-2b, 10-3b, and 10-4b according to an address accessed by the memory apparatus 1 according to an embodiment will be described with reference to FIG. 9.

Figure 9:
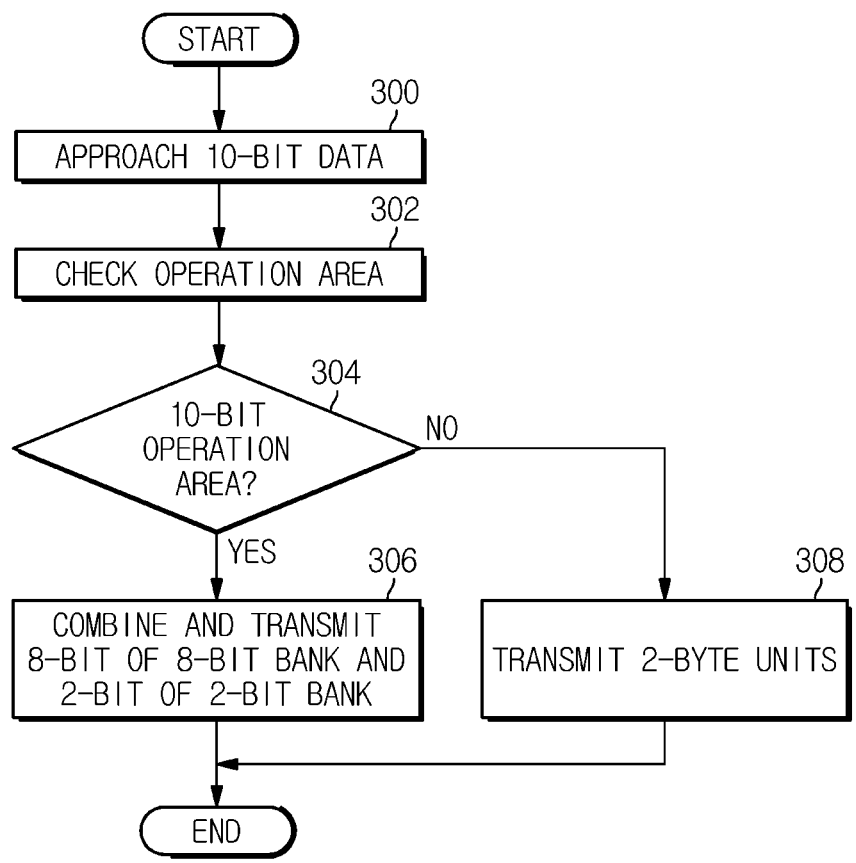
FIG. 9 is a flowchart illustrating a control algorithm for processing 10-bit data in a memory apparatus according to an embodiment.

FIG. 9 is a flowchart illustrating a control algorithm for processing 10-bit data in a memory apparatus according to an embodiment.

In FIG. 9, the memory controller 100 approaches addresses of the memory banks 10-0, 10-1, 10-2, 10-3, and 10-4 to read the 10-bit data stored in the memory banks 10-0, 10-1, 10-2, 10-3, and 10-4 (300).

The memory controller 100 may access the memory banks 10-0, 10-1, 10-2, 10-3, and 10-4 based on the boundary N of 8 bits and 10 bits. The address of the 10-bit area can be stored in the bank 0 to the bank 3 as it is in 8-bits if it is even, and only 2 bits in 2-bit bank (bank 4) can be stored if it is odd. When the processor stores 16-bit data, the lower 8 bits can be stored as they are, and only the upper 8 bits can store 2 bits.

As for the 8-bit operation areas 10-0a, 10-1a, 10-2a, and 10-3a, only the banks 0 to 3 are used, and since each 8-bit address is accessed, the address value increases by 1 internally. Meanwhile, the 10-bit operation areas 10-0b, 10-1b, 10-2b, 10-3b, and 10-4b use a 16-bit address space to store 10-bit data, but the actual memory can be configured to use only 10 bits. That is, the bank 0 to the bank 3 can store 8 bits and the remaining 2 bits can be stored in the bank 4. When accessing the memory banks 10-0, 10-1, 10-2, 10-3, and 10-4 in bytes, for example, when accessing address 0 of a 10-bit address, 8 bits of the first 10-bit data are accessed. When the address 1 is accessed, the remaining 2 bits of the first 10-bit data are accessed.

In this way, the memory controller 100 checks the operation area of the memory banks 10-0, 10-1, 10-2, 10-3, and 10-4 in which 10-bit data is stored (302), and determines whether it is the 10-bit operation areas 10-0b, 10-1b, 10-2b, 10-3b, and 10-4b (304).

For example, for the operation area, the memory access of the 8-bit operation areas 10-0a, 10-1a, 10-2a, and 10-3a is 32 bits of one bank word, so the lower bits of the access address (Addr [1: 0]) indicates a position in the memory banks 10-0, 10-1, 10-2, and 10-3. Because there are four of the first memory banks 10-0, 10-1, 10-2, and 10-3, the next 2 bits (Addr [3: 2]) are used as addresses to determine which of the memory banks 10-0, 10-1, 10-2 or 10-3 to access. The rest of the addresses can serve to select the index of the entire memory banks 10-0, 10-1, 10-2, 10-3, and 10-4.

For example, if 32 bits are read from address 0, all the words of the bank 0 are selected and the 32 bits of index 0 of the bank 0 can be read. In addition, when 32 bits are read from address 20 (10100B), Addr [1: 0] reads all 32 bits effectively, and since Addr [3: 2] is 1, the bank 1 is selected so that 32 bits of index 1 of the bank 1 can be read.

In the case of the 10-bit operation areas 10-0b, 10-1b, 10-2b, 10-3b, and 10-4b, the lowest 1 bit (Addr [0]) is used to distinguish whether it is the bank 0~the bank 3 or the bank 4, the next bit (Addr [2: 1]) is utilized as a position in the memory banks 10-0, 10-1, 10-2, 10-3, and 10-4, and the next 2 bits (Addr [4: 3]) can be used for selecting one of the four memory banks (10-0, 10-1, 10-2, and 10-3 and the location in the bank 4. And the rest of the addresses can serve to select the index of the memory banks 10-0, 10-1, 10-2, 10-3, and 10-4.

When a 10-bit area is accessed in 2-byte units, 8 bits are accessed from the bank 0 to the Bank 3, and 2 bits are accessed from the bank 4. In the case of the bank 4, since one address accesses in 2-bit units, the address used by 32-bit is 0-15, at this time, the internal address used is accessed by selecting 2 bits out of 32 bits using Addr [4: 1].

For example, if 32 bits are read from address 20 (10100B) of the 10-bit operation areas 10-0b, 10-1b, 10-2b, 10-3b, and 10-4b, 16 bits can be read from the bank 0 to the bank 3, and 4 bits can be read from the bank 4. Among the banks 0 to 3, since Addr [2: 1] is 2, the bank 2 is selected, and since Addr [4: 3] is 2, [31:16] information is read, because Addr [31: 5] is 0, index 0 is selected. In the bank 4, since Addr [4: 1] is 10 and reads 4 bits (2 bits address, but actually 4 bits), information from addresses 20 to 23 can be read.

As a result of the judgment in the step 304, if the 10-bit operation areas 10-0b, 10-1b, 10-2b, 10-3b, and 10-4b, the memory controller 100 can combine and transfer 8-bit data of the 8-bit first memory banks 10-0, 10-1, 10-2, and 10-3, and 2-bit data of the 2-bit second memory bank 10-4 (306).

On the other hand, as a result of the determination in the step 304, if it is not the 10-bit operation areas 10-0b, 10-1b, 10-2b, 10-3b, and 10-4b, the memory controller 100 transmits 2-bit data of the first memory banks 10-0, 10-1, 10-2, and 10-3, which are 8-bit banks (308).

Meanwhile, in one embodiment, a method of storing and reading data in units of 10 bits has been described as an example, but is not limited to this, and it is of course possible to achieve the same purpose and effect even in 12-bit unit data.

It can be stored and used in the plurality of memory banks 10: 10-0, 10-1, 10-2, 10-3, and 10-4 through a computer-readable recording medium having the above-described data processing method.

The above detailed description is to illustrate the embodiments. In addition, the above-described content is to describe preferred embodiments, and the present invention can be used in various other combinations, modifications and environments. That is, it is possible to change or modify the scope of the concept of the invention disclosed herein, the scope equivalent to the disclosed contents, and/or the scope of the art or knowledge in the art. The embodiments describe the best state for implementing the technical spirit of the present invention, and various changes required in specific application fields and uses of the present invention are possible. Accordingly, the detailed description of the invention is not intended to limit the invention to the disclosed embodiments. In addition, the appended claims should be construed to include other embodiments.

What is claimed is:

1. A memory apparatus, comprising:
a plurality of memory banks configured to store data; and
a memory controller configured to allocate addresses for accessing the plurality of memory banks according to a bit unit of the data; wherein
the memory controller is configured to process 10-bit data by allocating addresses in 8-bit units for some of the plurality of the memory banks, and allocating addresses in 2-bit units for the other memory banks,
wherein the plurality of memory banks further includes:
a first memory bank to which addresses are allocated in the 8-bit units, and
a second memory bank to which addresses are allocated in the 2-bit units,
wherein the memory controller is configured to determine whether to access only the first memory bank or access the first memory bank and the second memory bank according to the bit unit of the data, and
wherein the first memory bank includes an 8-bit operation area for accessing 8-bit data and a 10-bit operation area for accessing the 10-bit data.

2. The memory apparatus of claim 1, wherein the memory controller is configured to process the 8-bit data by accessing only the first memory bank when the data is in 8-bit units.

3. The memory apparatus of claim 1, wherein the memory controller is configured to access the first memory bank and the second memory bank to combine and process 8 bit data of the first memory bank and 2-bit data of the second memory bank when the data is in 10-bit units.

4. The memory apparatus of claim 1, wherein the second memory bank includes a 10-bit operation area for accessing the 10-bit data.

5. The memory apparatus of claim 4, wherein the memory controller is configured to access the first memory bank and the second memory bank by dividing the 10-bit data into upper 8-bit data and lower 2-bit data.

6. The memory apparatus of claim 5, wherein the memory controller is configured to access the upper 8-bit data to the 10-bit operation area of the first memory bank, and access the lower 2-bit data to the 10-bit operation area of the second memory bank and then combine the accessed upper 8-bit data and the accessed lower 2-bit data.

7. The memory apparatus of claim 4, wherein the first memory bank uses an 8-bit address in the 10-bit operation area, and comprises the plurality of memory banks, and the plurality of memory banks includes bank 0, bank 1, and bank 3.

8. The memory apparatus of claim 7, wherein the second memory bank uses a 2-bit unit address in the 10-bit operation area, and comprises ai-s composed of bank 4.

9. The memory apparatus of claim 8, wherein the memory controller is configured to allocate 8 bit memory space at a $3^{rd}$ position of bank 2 when the memory controller stores the 10-bit data in addresses 10 to 11 of the 8-bit operation area, and all uses 16-bit memory space by allocating 8-bit memory space at a $4^{th}$ position of bank 2.

10. The memory apparatus of claim 8, wherein the memory controller is configured to allocate 8 bit memory space at a $2^{nd}$ position of bank 1 when the memory controller stores the 10-bit data in addresses 10 to 11 of the 10-bit operation area, and all uses 10-bit memory space by allocating 2-bit memory space at a $6^{th}$ position of the bank 4.

11. The memory apparatus of claim 4, wherein the first memory bank and the second memory bank further include a 12-bit operation area for accessing 12-bit data, and the memory controller is configured to access the first memory bank and the second memory bank by dividing the 12-bit data into upper 8-bit data and lower 4-bit unit data.

12. A data processing method of a memory apparatus including a plurality of memory banks for storing data, the method comprising:
determining whether to access only a first memory bank or access the first memory bank and a second memory bank according to a bit unit of the data;
allocating an address in 8-bit units to the first memory bank of the plurality of memory banks;
allocating an address in 2-bit units to the second memory bank of the plurality of memory banks; and
processing 10-bit data using the first memory bank and the second memory bank,
wherein the first memory bank includes an 8-bit operation area for accessing 8-bit data and a 10-bit operation area for accessing 10-bit data.

13. A non-transitory computer-readable recording medium storing instructions which, when executed, cause a processor to perform operations comprising:
determining whether to access only a first memory bank or access the first memory bank and a second memory bank according to a bit unit of the data;
allocating an address in 8-bit units to the first memory bank of a plurality of memory banks storing data;
allocating an address in 2-bit units to the second memory bank of the plurality of memory banks; and
processing 10-bit data using the first memory bank and the second memory bank,
wherein the first memory bank includes an 8-bit operation area for accessing 8-bit data and a 10-bit operation area for accessing 10-bit data.

* * * * *